(12) United States Patent
Gattere et al.

(10) Patent No.: US 11,965,906 B2
(45) Date of Patent: Apr. 23, 2024

(54) CLOSED-LOOP MICROELECTROMECHANICAL ACCELEROMETER WITH COMPENSATION OF SPURIOUS VIBRATION MODES AND PROCESS FOR MANUFACTURING A MICROELECTROMECHANICAL ACCELEROMETER

(71) Applicant: STMicroelectronics S.r.l., Agrate Brianza (IT)

(72) Inventors: Gabriele Gattere, Castronno (IT); Jean Marie Darmanin, Marsaxlokk (MT); Francesco Rizzini, Passirano (IT); Carlo Valzasina, Gessate (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 17/866,378

(22) Filed: Jul. 15, 2022

(65) Prior Publication Data
US 2023/0028797 A1  Jan. 26, 2023

(30) Foreign Application Priority Data
Jul. 23, 2021  (IT) ........................ 102021000019694

(51) Int. Cl.
| | | |
|---|---|---|
| *G01P 15/125* | (2006.01) | |
| *G01P 1/00* | (2006.01) | |
| *G01P 15/08* | (2006.01) | |
| *G01P 15/13* | (2006.01) | |

(52) U.S. Cl.
CPC .............. *G01P 15/125* (2013.01); *G01P 1/00* (2013.01); *G01P 15/0802* (2013.01); *G01P 15/131* (2013.01); *G01P 2015/0831* (2013.01)

(58) Field of Classification Search
CPC .... G01P 15/125; G01P 15/0802; G01P 15/13; G01P 15/131; G01P 2015/0831; G01P 1/00
See application file for complete search history.

(56) References Cited

U.S. PATENT DOCUMENTS

| | | | |
|---|---|---|---|
| 6,220,096 B1 | 4/2001 | Gutierrez et al. | |
| 2004/0160232 A1* | 8/2004 | Yue ........................ | G01P 15/125 324/660 |
| 2005/0109109 A1* | 5/2005 | Eskridge ............. | G01P 15/0802 73/514.32 |

(Continued)

FOREIGN PATENT DOCUMENTS

EP  0691542 A1  1/1996

*Primary Examiner* — Helen C Kwok
(74) *Attorney, Agent, or Firm* — Seed IP Law Group LLP

(57) ABSTRACT

A closed-loop microelectromechanical accelerometer includes a substrate of semiconductor material, an out-of-plane sensing mass and feedback electrodes. The out-of-plane sensing mass, of semiconductor material, has a first side facing the supporting body and a second side opposite to the first side. The out-of-plane sensing mass is also connected to the supporting body to oscillate around a non-barycentric fulcrum axis parallel to the first side and to the second side and perpendicular to an out-of-plane sensing axis. The feedback electrodes are capacitively coupled to the sensing mass and are configured to apply opposite electrostatic forces to the sensing mass.

19 Claims, 8 Drawing Sheets

(56) References Cited

U.S. PATENT DOCUMENTS

| | | | | |
|---|---|---|---|---|
| 2008/0173091 | A1* | 7/2008 | McNeil | G01P 15/125 |
| | | | | 73/514.32 |
| 2010/0175473 | A1* | 7/2010 | Classen | G01P 15/125 |
| | | | | 73/514.29 |
| 2012/0000287 | A1* | 1/2012 | Frangi | G01P 15/125 |
| | | | | 73/514.32 |
| 2013/0333471 | A1* | 12/2013 | Chien | G01P 15/0802 |
| | | | | 73/514.32 |
| 2015/0268268 | A1* | 9/2015 | Liu | G01P 15/125 |
| | | | | 73/514.32 |
| 2016/0377648 | A1* | 12/2016 | Zhang | G01P 15/125 |
| | | | | 73/514.32 |
| 2021/0363000 | A1 | 11/2021 | Allegato et al. | |
| 2023/0160921 | A1* | 5/2023 | Gattere | G01P 15/125 |
| | | | | 73/514.32 |

\* cited by examiner

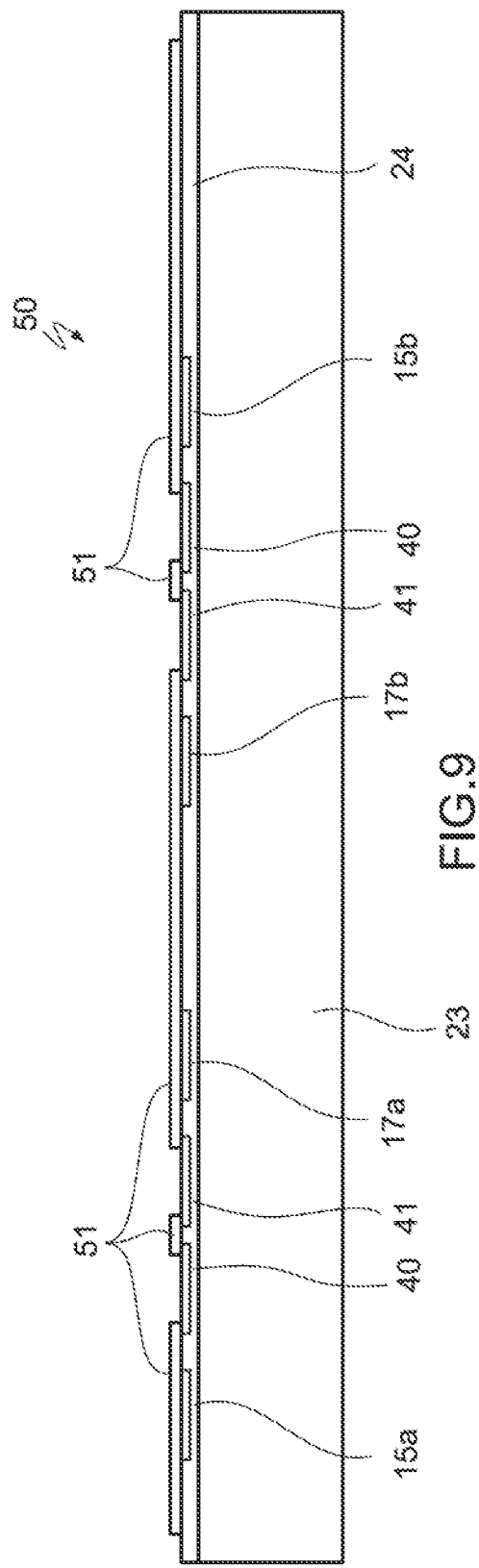
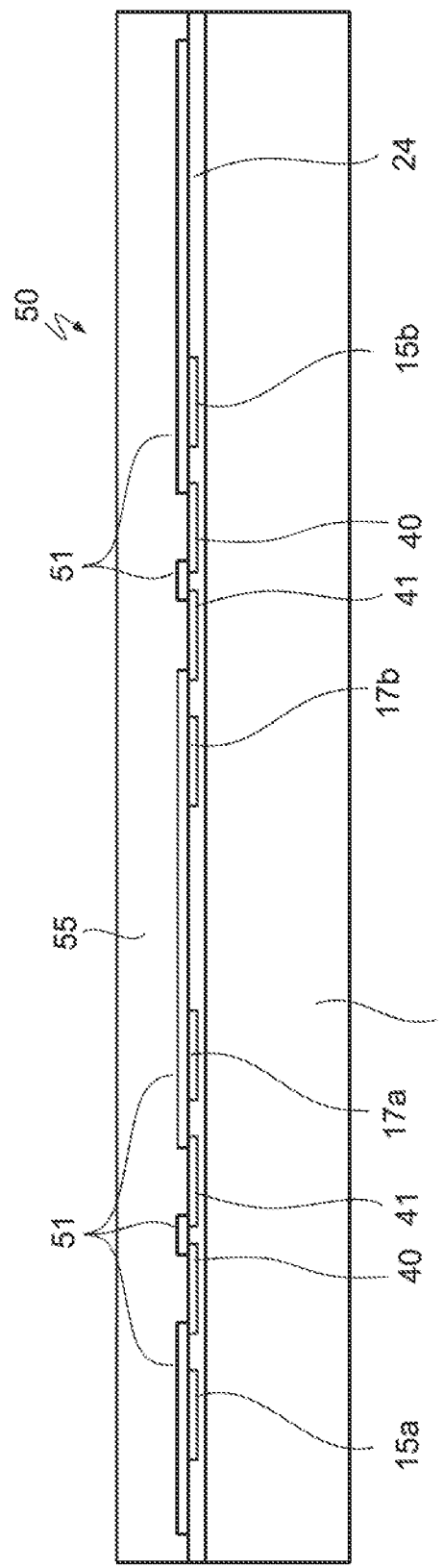

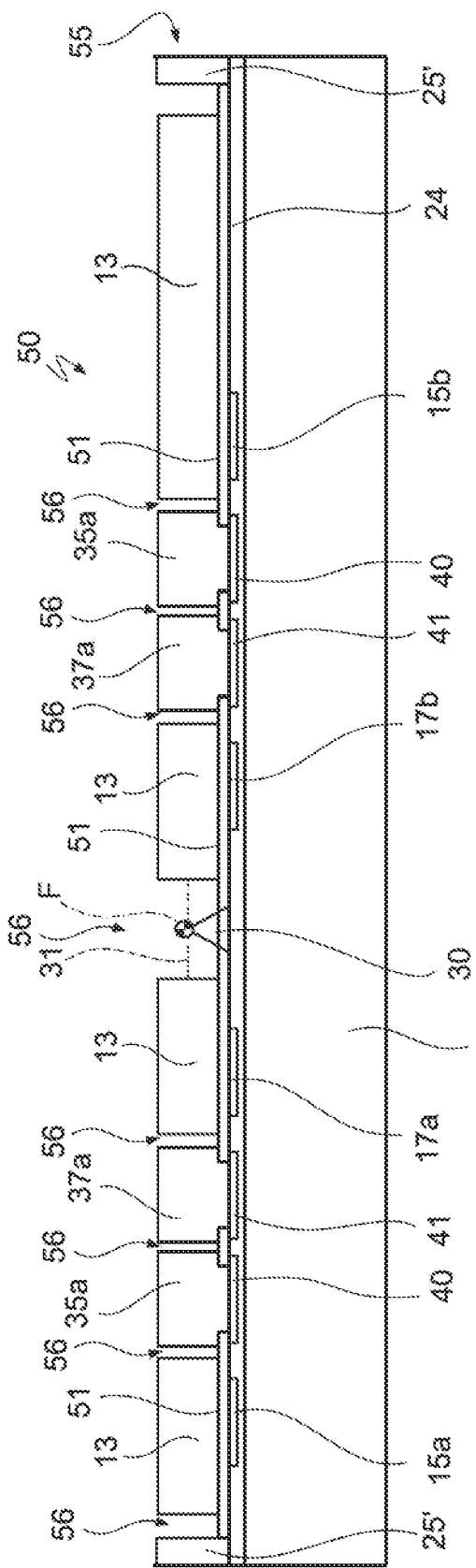
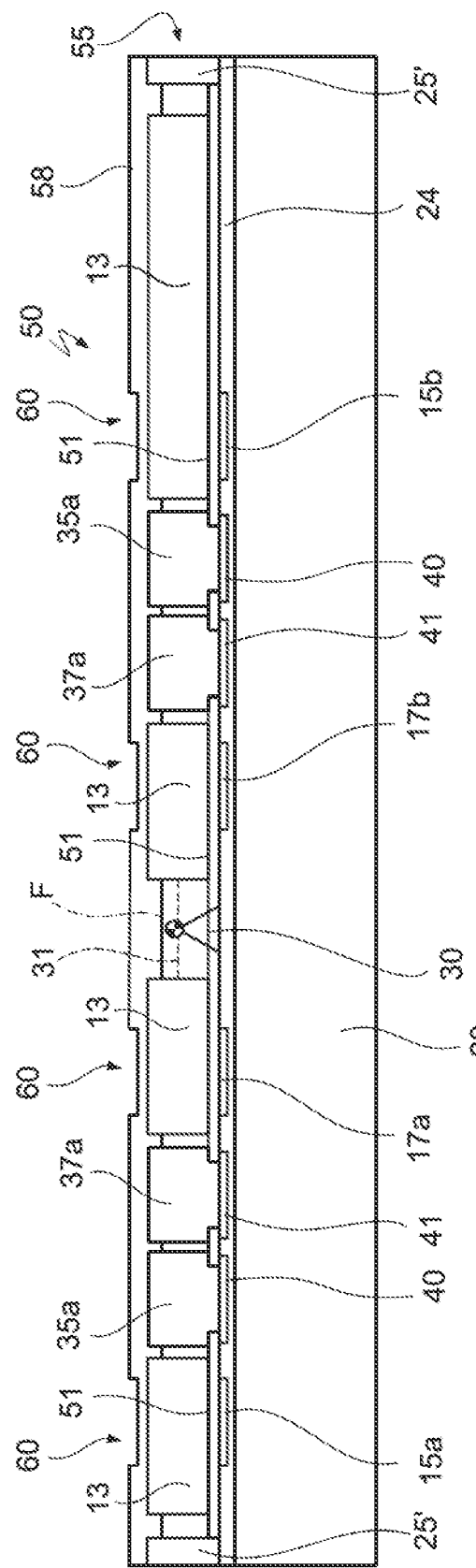

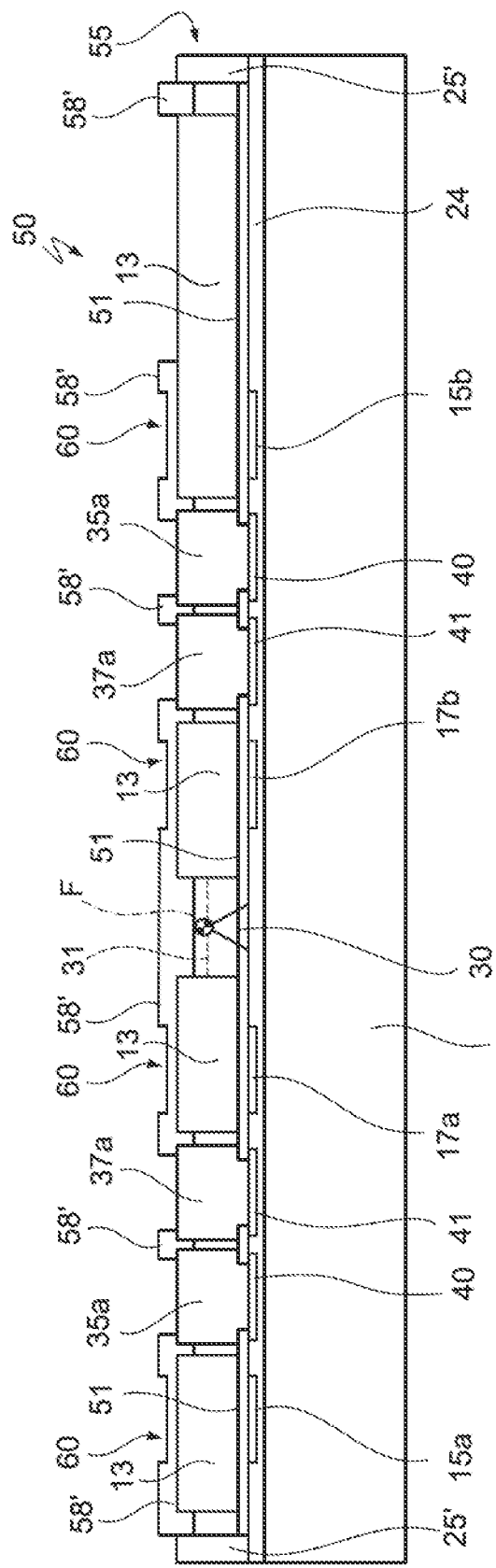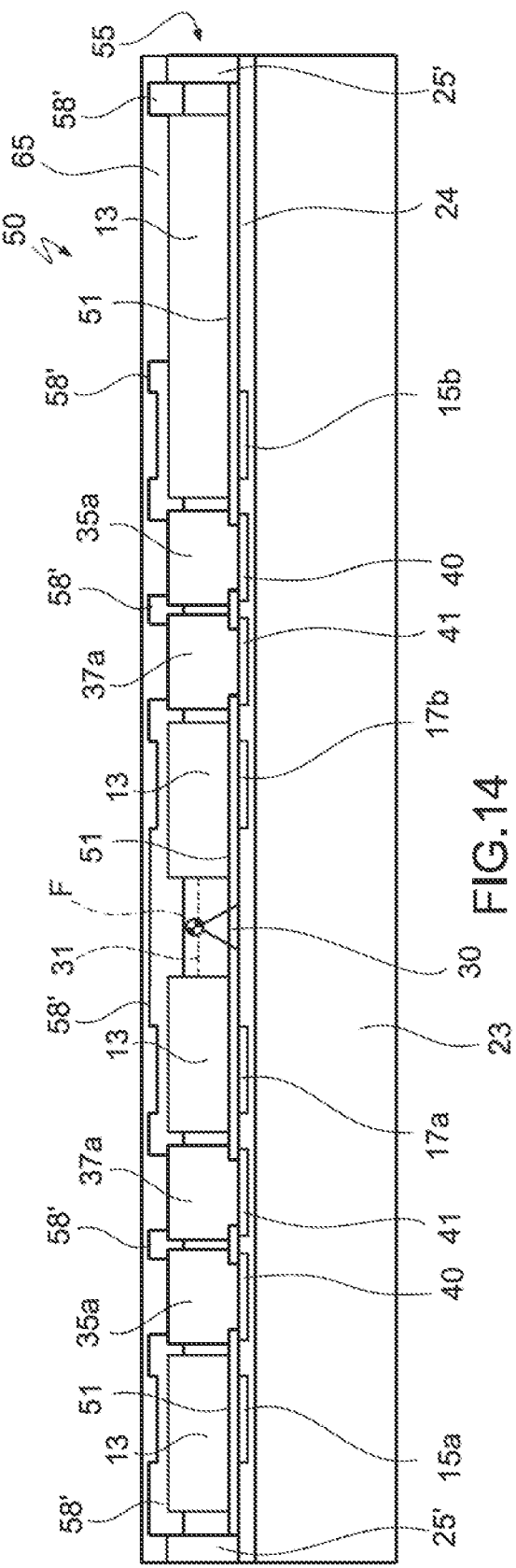

CLOSED-LOOP MICROELECTROMECHANICAL ACCELEROMETER WITH COMPENSATION OF SPURIOUS VIBRATION MODES AND PROCESS FOR MANUFACTURING A MICROELECTROMECHANICAL ACCELEROMETER

BACKGROUND

Technical Field

The present disclosure relates to a closed-loop microelectromechanical accelerometer with compensation of spurious vibration modes and to a process for manufacturing a microelectromechanical accelerometer.

Description of the Related Art

As is known, among the innumerable applications of the accelerometers, in particular microelectromechanical ones, the monitoring of vibrations in machines of industrial plants, such as motors, turbines, pumps and so on is particularly important. The early and accurate identification of anomalous vibrations is decisive to avoid not only failures and potentially serious damage to the plants, but also for the correct execution of suitable maintenance interventions, so as to optimize costs and in general maintain efficiency at high levels.

A problem for this type of applications arises from the fact that monitoring requires or otherwise relies on high performance not only in terms of sensitivity and noise, but also in terms of bandwidth, as anomalous vibrations may be related to a wide range of phenomena and, consequently, appear on a very broad spectrum. Among the accelerometers that are best suited for their characteristics are bulk piezoelectric accelerometers, open-loop capacitive microelectromechanical accelerometers and closed-loop microelectromechanical accelerometers. However, all suffer from limitations that make the results not entirely satisfactory.

Bulk piezoelectric accelerometers, for example, have a very wide band and an optimum dynamic range, but are bulky and expensive and require to or typically should be recalibrated relatively frequently, without having the possibility of self-diagnosis procedures. Furthermore, the sensitivity depends significantly on the temperature and generally only sensors of uniaxial type may be produced.

Open-loop capacitive microelectromechanical accelerometers have the advantage of small size and low cost, without excessively scarifying the band. Beyond a certain limit, however, a tradeoff is to be sought between the bandwidth on the one hand and the noise levels and sensitivity on the other hand. In fact, while the noise tends to increase as the bandwidth increases, to the detriment of the quality of the measurements, the sensitivity decreases quadratically.

Closed-loop microelectromechanical accelerometers apply feedback forces to cancel the inertial forces acting on a movable mass and maintain the movable mass in proximity to an equilibrium position; the intensity of the control is a measure of the inertial forces that are opposed. This solution allows to combine stability, linearity and low noise levels of sensors operating on relatively narrow frequency ranges with a large bandwidth. Closed-loop microelectromechanical accelerometers may also be used to manufacture triaxial devices, combining sensing structures of the in-plane and out-of-plane type. Particularly in sensors of the out-of-plane type, however, feedback forces may trigger spurious vibration modes of the movable masses.

BRIEF SUMMARY

In various embodiments, the present disclosure provides a microelectromechanical accelerometer and a process for manufacturing a microelectromechanical accelerometer which allow the described limitations to be overcome or at least mitigated.

According to the present disclosure a microelectromechanical device and a process for manufacturing a microelectromechanical device are provided.

In one or more embodiments, a closed-loop microelectromechanical accelerometer is provided that includes a substrate of semiconductor material. An out-of-plane sensing mass of semiconductor material has a first side facing the supporting body and a second side opposite to the first side, and the out-of-plane sensing mass is connected to the supporting body to oscillate around a non-barycentric fulcrum axis parallel to the first side and to the second side and perpendicular to an out-of-plane sensing axis. Feedback electrodes are capacitively coupled to the sensing mass and configured to apply opposite electrostatic forces and a torque around the fulcrum axis to the sensing mass. The feedback electrodes include a first group of feedback electrodes facing the first side of the out-of-plane sensing mass and a second group of feedback electrodes facing the second side of the out-of-plane sensing mass.

In one or more embodiments, an electronic system is provided that includes processing circuitry that is coupled to the closed-loop microelectromechanical accelerometer.

In one or more embodiments, a process for manufacturing a closed-loop microelectromechanical accelerometer is provided that includes: forming an out-of-plane sensing mass of semiconductor material, having a first side facing the supporting body and a second side opposite to the first side, wherein the out-of-plane sensing mass is connected to a supporting body to oscillate around a non-barycentric fulcrum axis parallel to the first side and to the second side and perpendicular to an out-of-plane sensing axis; and forming feedback electrodes, capacitively coupled to the sensing mass and configured to apply opposite electrostatic forces and a torque around the fulcrum axis to the sensing mass. Forming the feedback electrodes includes: forming a first epitaxial structural layer on a substrate of the supporting body, the first epitaxial structural partially separated from the substrate by an insulating layer with openings; forming a first group of feedback electrodes between the substrate and the first side of the out-of-plane sensing mass; forming hard masking regions on the first epitaxial structural layer and first openings between adjacent hard masking regions; forming a second epitaxial structural layer connected to the first epitaxial structural layer through the first openings; and forming a second group of feedback electrodes from the second epitaxial structural layer.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIGS. 9-15 are cross-sections through a wafer of semiconductor material in subsequent steps of a manufacturing process according to an embodiment of the present disclosure.

DETAILED DESCRIPTION

Figure 1:
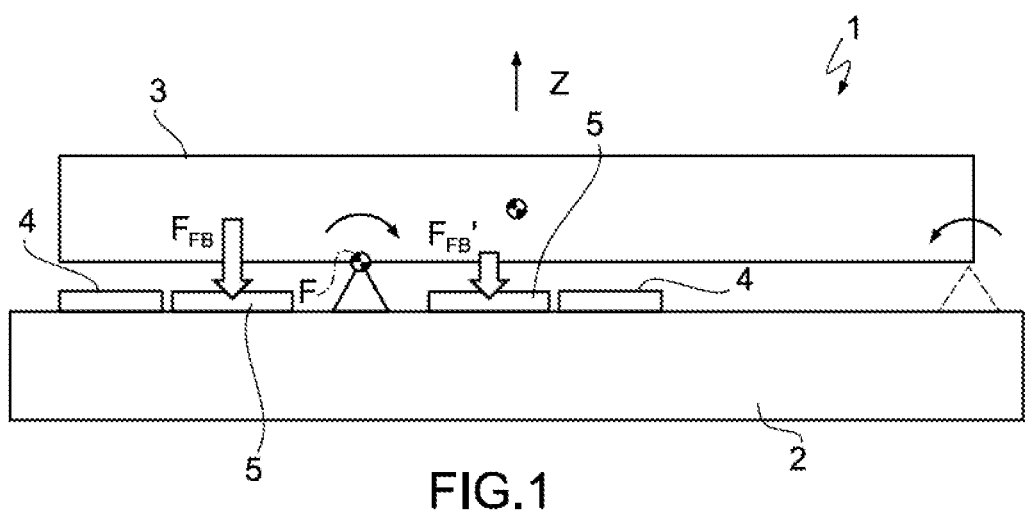
FIG. 1 is a cross-section through a microelectromechanical device of a comparative example.

As shown schematically in FIG. 1, a closed-loop microelectromechanical accelerometer 1 of the out-of-plane type of a comparative example includes a substrate 2 of semiconductor material, a movable mass 3, defined by a plate also of semiconductor material, sensing electrodes 4 and feedback electrodes 5. The movable mass 3 has a barycenter G and is connected to the substrate 2 at a fulcrum 6 with an offset with respect to the barycenter G. In practice, the movable mass 3 is connected so as to be able to rotate, with respect to the substrate 2, around a non-barycentric fulcrum axis F. In the absence of external forces applied, the movable mass 3 is maintained in an equilibrium position, for example parallel to the substrate 2, by flexures not shown here.

When an external force causes a displacement of the accelerometer 1 along an axis Z perpendicular to the substrate 2, the movable mass 3 tends to rotate around the fulcrum axis F and the displacements are sensed by the sensing electrodes 4. A control device (not shown) applies electrostatic feedback forces $F_{FB}$, $F_{FB}'$ through the feedback electrodes 5 to bring the movable mass 3 back to the equilibrium position and cancel the displacements. However, since the electrostatic feedback forces $F_{FB}$, $F_{FB}'$ may only be of attractive type, the movable mass 3 is subject to a non-zero net force due to the control. The net force caused by the control may trigger spurious vibration modes, which appear as a torque applied to one end of the movable mass 3 and modify the movement of the movable mass 3 of the same. The control device of the comparative example has no way of discriminating the cause of the movements of the movable masses and reacts by trying to compensate also the forces caused by the spurious vibration modes, but in doing so equally spurious signal components are introduced which degrade the quality of the measurements. However, as described herein, the present disclosure provides various embodiments which overcome or reduce the limitations of the comparative example.

Figure 2:
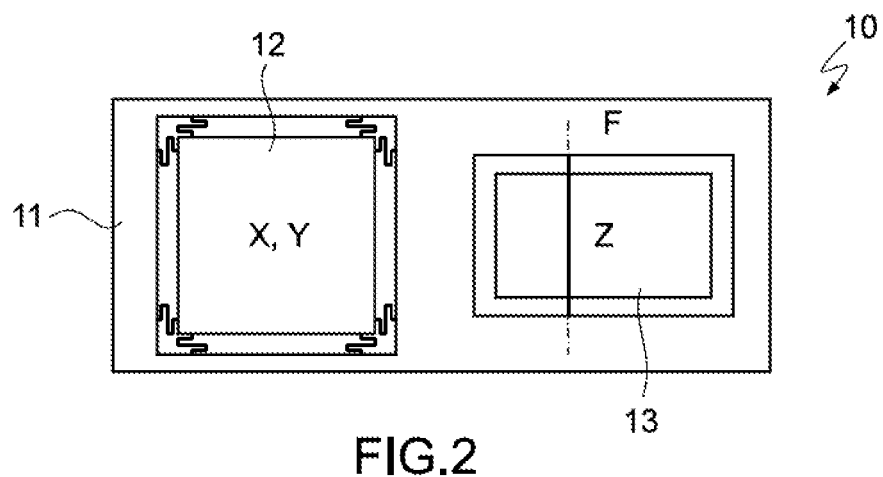
FIG. 2 is a schematic representation of a microelectromechanical accelerometer according to an embodiment of the present disclosure.

With reference to FIG. 2, a microelectromechanical device according to an embodiment of the present disclosure is schematically illustrated and indicated with the number 10. In the illustrated example, in particular, the microelectromechanical device 10 is a triaxial accelerometer comprising a supporting body 11, an in-plane sensing mass 12, which responds to accelerations in an XY-plane parallel to a face of the supporting body 11, and an out-of-plane sensing mass 13, which responds to accelerations along an out-of-plane sensing axis Z perpendicular to the XY-plane. However, the use in triaxial accelerometers is not to be considered as limiting and it is understood that the disclosure may equally be used to make uniaxial or biaxial accelerometers with out-of-plane sensing along an axis.

Figure 3:
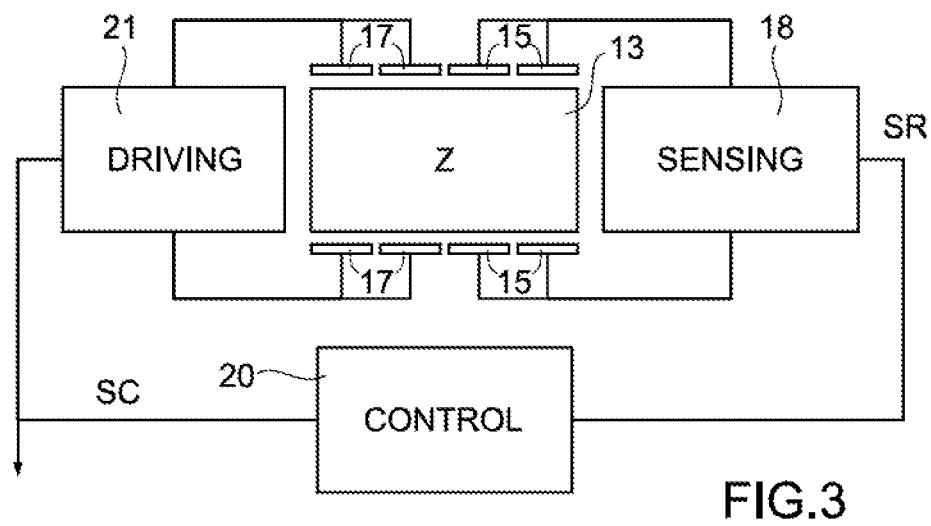
FIG. 3 is a simplified block diagram of a part of the microelectromechanical accelerometer of FIG. 2.

FIG. 3 illustrates, in a simplified manner, the operation of the accelerometer 10 relative to the sensing of accelerations along the Z-axis. The accelerometer 10, in particular, is provided with sensing electrodes 15 and with feedback electrodes 17 capacitively coupled to the out-of-plane sensing mass 13 and comprises a sensing stage 18, a control device 20 and a driving stage 21. The sensing stage 18, through the sensing electrodes 15, generates reading signals SR indicative of the angular position of the out-of-plane sensing mass 13 around a fulcrum axis F. From the reading signals SR, the control device 20 generates control signals SC which are applied to the feedback electrodes 17 through the driving stage 21 and tend to bring the out-of-plane sensing mass 13 back to an equilibrium position.

Figure 4:
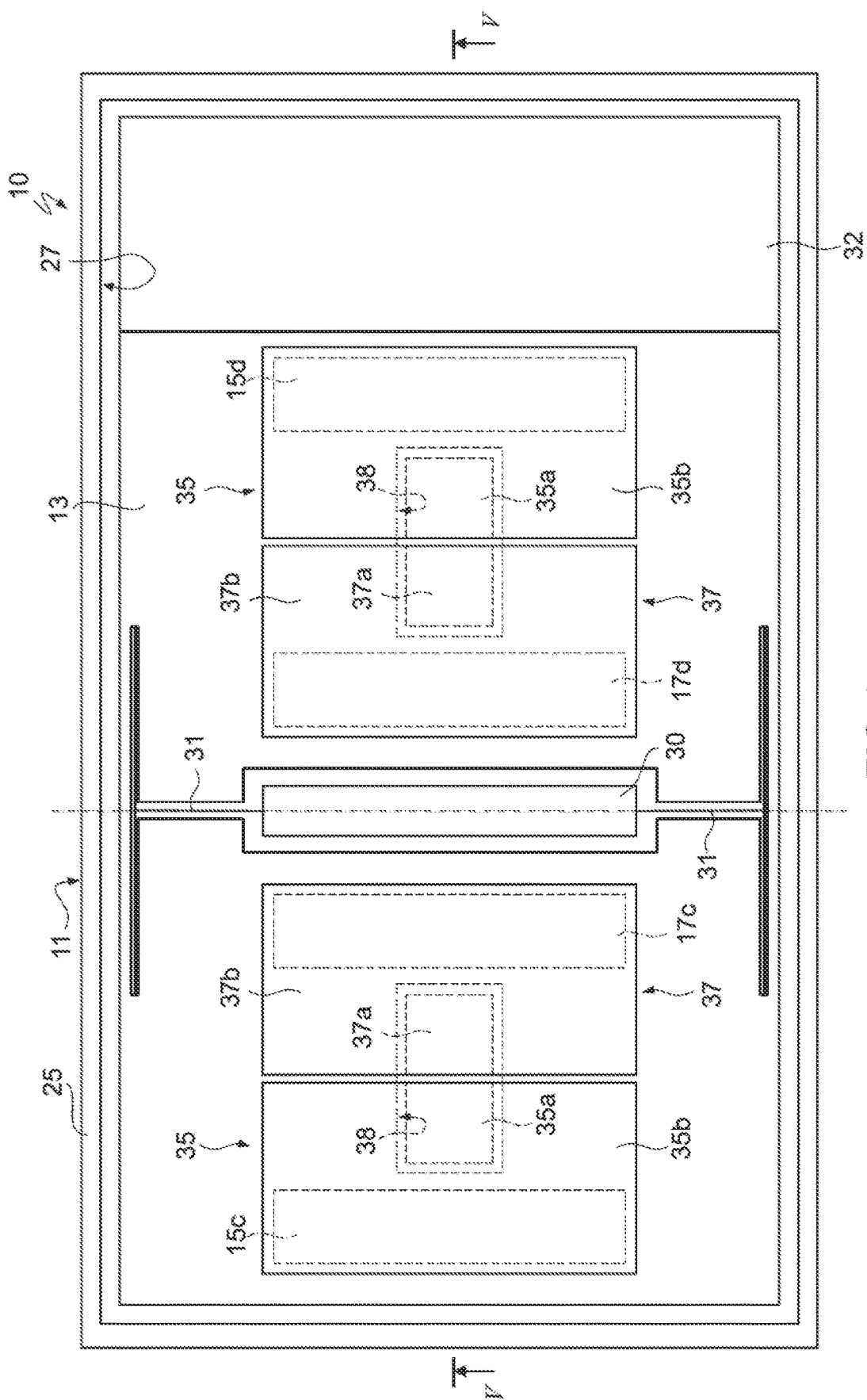
FIG. 4 is a top-plan view of a part of the microelectromechanical accelerometer of FIG. 2, with parts removed for clarity.
Figure 5:
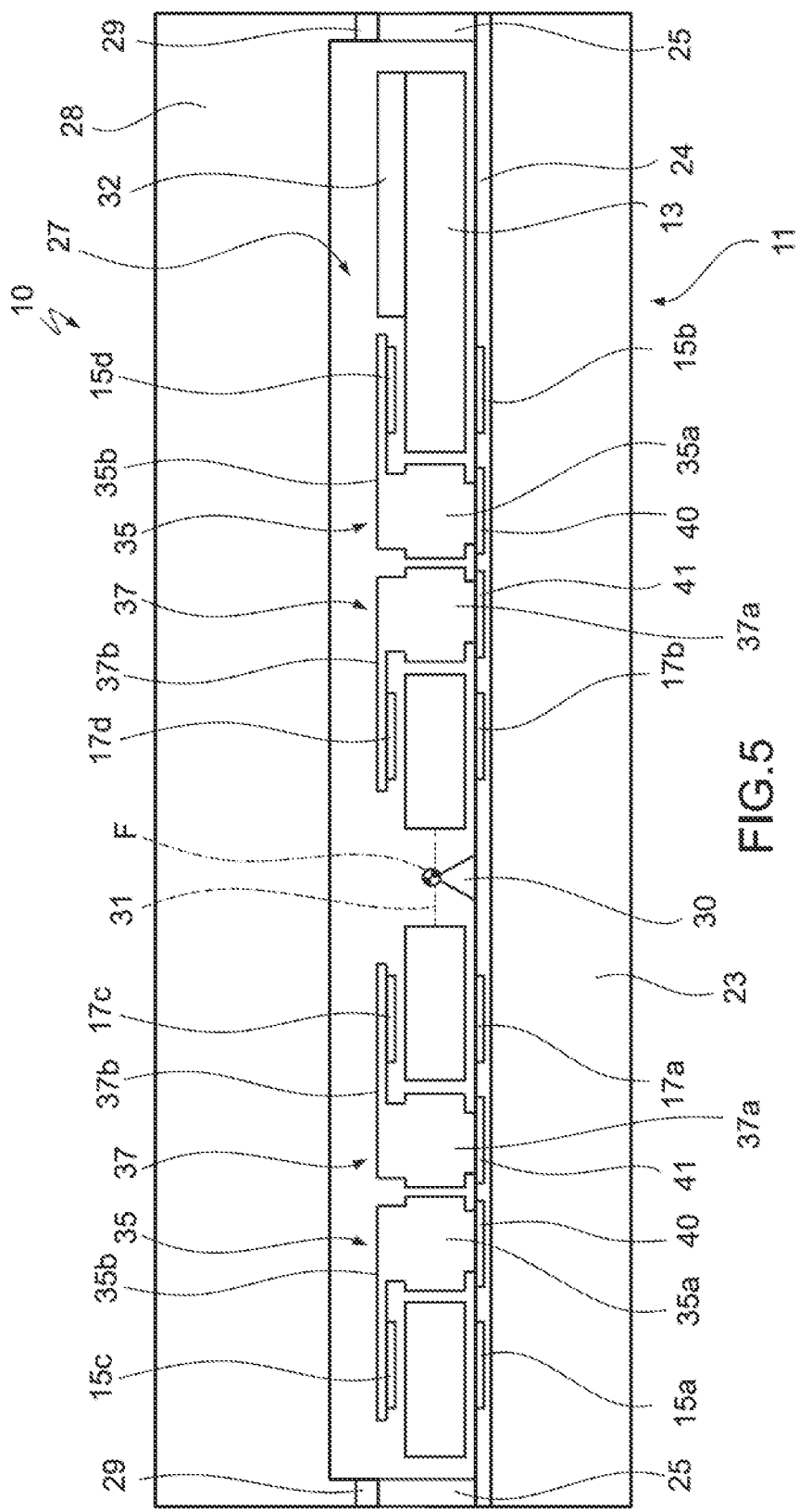
FIG. 5 is a cross-section through the microelectromechanical accelerometer of FIG. 2, taken along line V-V of FIG. 4.

The micromechanical part of the accelerometer 10 relating to the out-of-plane sensing is shown in more detail in FIGS. 4 and 5, where the supporting body 11, the out-of-plane sensing mass 13, the sensing electrodes and the feedback electrodes are illustrated in particular. The supporting body 11 comprises a substrate 23 of semiconductor material, covered by an insulating layer 24, and a perimeter wall 25, which defines, with the substrate 23, a cavity 27 where the out-of-plane sensing mass 13 is accommodated. A cap 28 is bonded to the perimeter wall 25 through an adhesion layer 29, for example glass-frit, and closes the cavity 27.

The out-of-plane sensing mass 13 is made of semiconductor material, for example polycrystalline silicon. The out-of-plane sensing mass 13 is also connected to the supporting body 11 through an anchor 30 and flexures 31, configured to allow rotations of the out-of-plane sensing mass 13 around the fulcrum axis F, which is a non-barycentric axis parallel to a face of the substrate 23 and perpendicular to the out-of-plane sensing axis Z. For ease of representation, the anchor 30 and the flexures 31 are illustrated only schematically in FIG. 5. To increase the imbalance of the out-of-plane sensing mass 13 with respect to the fulcrum axis F and the sensitivity of the accelerometer 10, one end of the out-of-plane sensing mass 13 further away from the anchor 30 is provided with an additional mass 32.

The sensing electrodes comprise a first group of sensing electrodes facing the first side of the out-of-plane sensing mass and a second group of sensing electrodes facing the second side of the out-of-plane sensing mass. In detail, the sensing electrodes include a first sensing electrode 15a, a second sensing electrode 15b, a third sensing electrode 15c and a fourth sensing electrode 15d, arranged in pairs symmetrically with respect to the fulcrum axis F so as to obtain differential signals. More precisely, the first sensing electrode 15a and the second sensing electrode 15b are formed on the insulating layer 24 in symmetrical positions with respect to the fulcrum axis F and face a first side 13a of the out-of-plane sensing mass 13 facing the substrate 23. The first sensing electrode 15a and the second sensing electrode 15b are capacitively coupled to the out-of-plane sensing mass 13 and electrically insulated from each other. The third sensing electrode 15c and the fourth sensing electrode 15d are formed on respective sensing supports 35 in symmetrical positions with respect to the fulcrum axis F and face a second side 13b of the out-of-plane sensing mass 13 opposite to the first side 13a. The third sensing electrode 15c and the fourth sensing electrode 15d are arranged in positions corresponding to the positions of the second sensing electrode 15b and of the first sensing electrode 15a, respectively. The third sensing electrode 15c and the fourth sensing electrode 15d are also capacitively coupled to the out-of-plane sensing mass 13 and electrically (FIG. 6) are insulated from each other and directly connected to the first sensing electrode 15a and to the second sensing electrode 15b, respectively. Therefore, for the symmetrical arrangement of the sensing electrodes, upon a rotation of the out-of-plane sensing mass 13 around the fulcrum axis F, the capacitive coupling varies in a differential manner with respect to the equilibrium position between the first sensing electrode 15a and the third sensing electrode 15c on one side and the second sensing electrode 15b and the fourth sensing electrode 15d on the other side.

Similarly, the feedback electrodes comprise a first group of feedback electrodes facing the first side of the out-of-plane sensing mass and a second group of feedback electrodes facing the second side of the out-of-plane sensing mass. In detail, the feedback electrodes include a first feedback electrode 17a, a second feedback electrode 17b, a third feedback electrode 17c and a fourth feedback electrode 17d, arranged in pairs symmetrically with respect to the fulcrum axis F. More precisely, the first feedback electrode 17a and the second feedback electrode 17b are formed on the insulating layer 24 in symmetrical positions with respect to the fulcrum axis F and face the first side 13a of the out-of-plane feedback mass 13. The first feedback electrode 17a and the second feedback electrode 17b are capacitively coupled to the out-of-plane feedback mass 13 and electrically insulated from each other. The third feedback electrode 17c and the fourth feedback electrode 17d are formed on respective feedback supports 37 in symmetrical positions with respect to the fulcrum axis F and face the second side 13b of the out-of-plane feedback mass 13. The third feedback electrode 17c and the fourth feedback electrode 17d are arranged in positions corresponding to the positions of the second feedback electrode 17b and of the first feedback electrode 17a, respectively. The third feedback electrode 17c and the fourth feedback electrode 17d are capacitively coupled to the out-of-plane feedback mass 13 and electrically (FIG. 7) are insulated from each other and directly connected to the first feedback electrode 17a and to the second feedback electrode 17b, respectively.

The feedback electrodes 17a-17d are also in positions which are closer to the anchor 30 with respect to the sensing electrodes 15a-15b.

Figure 6:
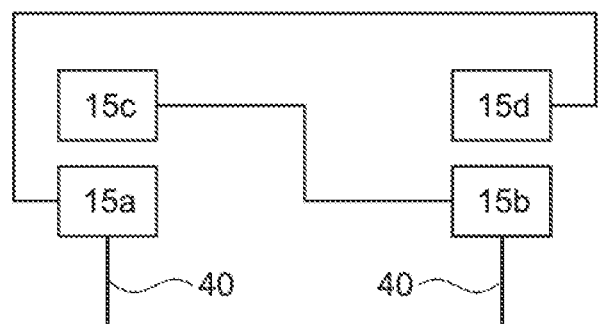
FIG. 6 is a simplified electrical diagram of a first detail of the microelectromechanical accelerometer of FIG. 2.
Figure 7:
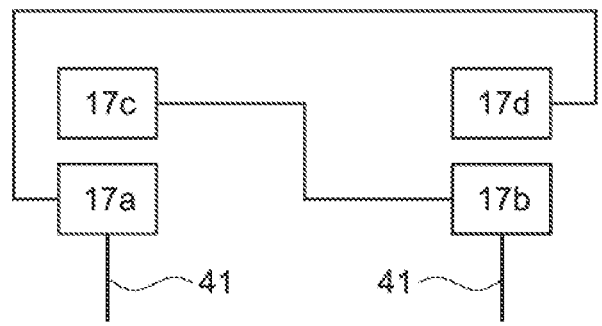
FIG. 7 is a simplified electrical diagram of a second detail of the microelectromechanical accelerometer of FIG. 2.

The sensing supports 35 and the feedback supports 37 are made of semiconductor material and are anchored to the substrate 20. In more detail, the sensing supports 35 and the feedback supports 37 have respective first structures 35a, 37a, extending from the substrate 20 in a direction parallel to the out-of-plane sensing axis Z through openings 38 in the out-of-plane sensing mass 13; and respective second structures 35b, 37b extending from the respective first structures 35a, 37a in a direction perpendicular to the out-of-plane sensing axis Z. The first structures 35a, 37a are anchored to the substrate 23 and are connected to respective conductive lines 40, 41 formed in the insulating layer 24 (FIGS. 6 and 7). More precisely, the first structures 35a of the sensing supports 35 are connected to respective conductive lines 40, which are insulated from each other. The first structures 37a of the feedback supports 37 are connected to respective conductive lines 41, which are insulated from each other. The second structures 35b, 37b of the sensing supports 35 and of the feedback supports 37 face the second side 13b of the out-of-plane sensing mass 13, opposite with respect to the substrate 20. The third sensing electrode 15c, the fourth sensing electrode 15d, the third feedback electrode 17c and the fourth feedback electrode 17d are arranged between the second structures 35b, 37b of the respective sensing supports 35 and feedback supports 37 and the out-of-plane sensing mass 13. Each sensing support 35 is adjacent to and aligned with a respective feedback support 37, with the respective first structures arranged through the same openings 38. The second structures 37b of the feedback supports 37 extend from the respective first structures 37a towards the anchor 30; the second structures of the sensing supports 35 extend from the respective first structures 35a in a direction opposite to the anchor 30.

Figure 8:
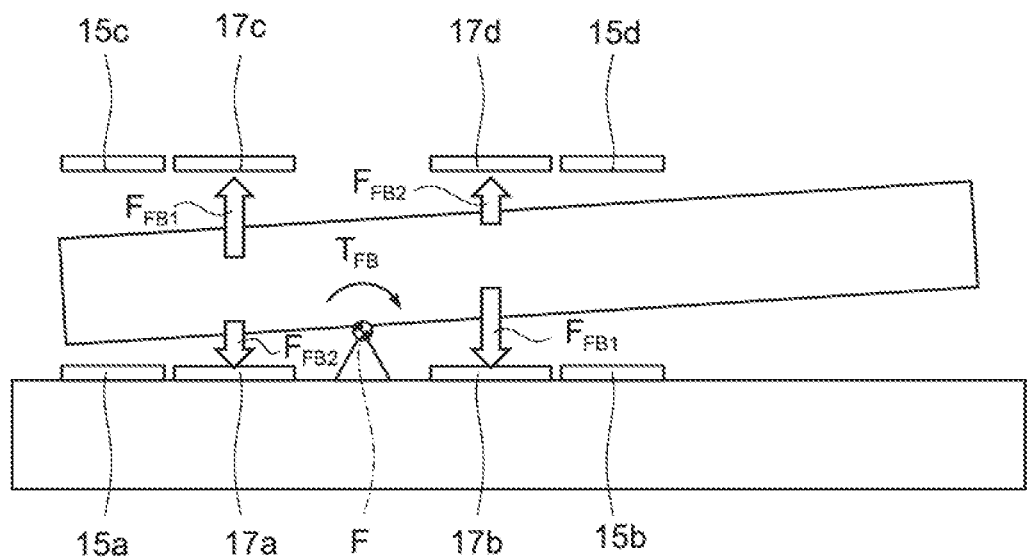
FIG. 8 is a schematic side view of the microelectromechanical accelerometer in use.

The feedback electrodes 17a-17d apply electrostatic feedback forces $F_{FB1}$, $F_{FB2}$ to the out-of-plane sensing mass 13 due to the control signals SC supplied by the control device 20 through the driving stage 21 to balance the external forces and bring the out-of-plane sensing mass 13 back to the equilibrium position (FIG. 8). Furthermore, for the symmetrical arrangement described, the electrostatic feedback forces $F_{FB1}$, $F_{FB2}$ have zero resultant, even if a feedback torque $T_{FB}$ is applied to the out-of-plane sensing mass 13 around the fulcrum axis F. In fact, the first feedback electrode 17a and the third feedback electrode 17c are always at an equal distance from the out-of-plane sensing mass 13 (according to the out-of-plane sensing axis Z), regardless of its angular position around the fulcrum axis. Since they are directly connected to each other and are at the same potential, the applied electrostatic feedback forces $F_{FB1}$ have equal modulus and opposite directions. Similarly, the second feedback electrode 17b and the fourth feedback electrode 17d apply electrostatic feedback forces $F_{FB2}$ with equal modulus and opposite directions. The zero resultant of the electrostatic feedback forces $F_{FB1}$, $F_{FB2}$ is practically unable to trigger spurious vibration modes, which, as discussed, appear in the form of a torque tending to rotate the out-of-plane sensing mass 13 around an axis other than the fulcrum axis F. Spurious signal components are also avoided. These signal components are in fact generated by the control device 20 to balance the effects of the spurious vibration modes, which cannot be discriminated from the inertial forces to be measured. Ultimately, therefore, the zero resultant of the electrostatic feedback forces $F_{FB1}$, $F_{FB2}$ avoids the triggering of spurious vibration modes and, consequently, spurious signal components that would otherwise be indistinguishable from the useful signal. The accelerometer according to the disclosure is therefore advantageous in terms of sensitivity, stability, linearity and bandwidth, as well as having a low cost with respect to sensors of the piezoelectric-type and being rather easily integrable into biaxial or triaxial devices.

The microelectromechanical device 10 of FIGS. 2-5 may be made through the process described hereinbelow with reference to FIGS. 9-15. In practice, the out-of-plane sensing mass 13, the anchor 30, the sensing supports 35, the feedback supports 37 and the respective sensing and feedback electrodes are obtained from two structural layers epitaxially grown on top of each other, as described in detail hereinbelow.

With reference to FIG. 9, a wafer 50 of semiconductor material, for example monocrystalline silicon, initially comprises the substrate 23, having the insulating layer 24, for example of silicon oxide, grown thereon. A conductive layer not shown in full, for example of polycrystalline silicon, is deposited on the insulating layer 24 and shaped to form the first sensing electrode 15a, the second sensing electrode 15b, the first feedback electrode 17a, the second feedback electrode 17b and the conductive lines 40, 41. A first sacrificial layer 51, for example of thermally-grown or deposited silicon oxide, is formed on the insulating layer 24 and covers the sensing electrodes 15a, 15b, the feedback electrodes 17a, 17b and the conductive lines 40, 41. The first sacrificial layer 51 is selectively etched in positions corresponding to the anchor 30 of the out-of-plane sensing mass 13, to the sensing electrodes 15a, 15b, to the feedback electrodes 17a, 17b and to the conductive lines 40, 41, where the first structures 35a, 37a of the sensing supports 35 and of the feedback supports 37 will be formed later on.

Then, FIG. 10, a first structural layer 55 is grown by epitaxy above the first sacrificial layer 51 from a deposited seed layer 55' and contacts the sensing electrodes 15a, 15b, the feedback electrodes 17a, 17b and the conductive lines 40, 41. The first structural layer 55 has a thickness which is determined on the basis of the characteristics of the desired micro-electro-mechanical structures and may be comprised for example between 2 and 80 µm. After the structural growth, the first structural layer 55 is planarized and brought to the desired final thickness, for example by CMP (Chemical Mechanical Polishing).

The first structural layer 55, FIG. 11, is etched to define bottom portions of the desired structures and of other regions provided according to the design preferences. In particular, in this step the anchor 30, the out-of-plane sensing mass 13, the flexures 31, a bottom portion 30' of the anchor 30, the first structures 35a, 37a of the sensing support 35 and of the feedback support 37 and bottom portions 25' of the perimeter wall 25 are formed from the first structural layer 55. For this purpose, the wafer 50 is covered by a resist mask not shown (first trench mask) and subject to a dry etching, forming trenches 56, which completely extend through the first structural layer 55. In this step, trenches (not shown) are also formed through the portion of the first structural layer 55 intended to form the out-of-plane sensing mass 13, which will have a lattice structure. The trenches will also be used in the subsequent steps for removing the sacrificial layer 51. The etching automatically stops on the first sacrificial layer 51.

Then, FIG. 12, a second sacrificial layer 58, for example of TEOS (TetraethylOrthoSilicate), is deposited for a thickness equal to the desired width W of a gap between the out-of-plane sensing mass 13 and the sensing supports 35 and the sensing supports 37. The second sacrificial layer 58 partially fills the trenches 56, for example to one third of their depth although this filling, as well as the extent and depth of filling are not important. The second sacrificial layer 58 is then planarized.

The second sacrificial layer 58 is selectively thinned in zones where the third sensing electrode 15c, the fourth sensing electrode 15d, the third feedback electrode 17c and the fourth feedback electrode 15d will have to be subsequently formed. For this purpose, by using a masking layer not shown (bump mask) a masked etching, for example a time-etching, is performed in a per se known manner, to form recesses 60 in positions corresponding to the first sensing electrode 15a, the second sensing electrode 15b, the first feedback electrode 17a, the second feedback electrode 17b. With the same bump mask, the areas intended for other structures of the accelerometer 10 are also delimited, such as the contact structures that limit out-of-plane displacements (bumps).

Subsequently, FIG. 13, the second sacrificial layer 58 is further etched and selectively removed throughout its thickness, using a masking layer not shown (second anchoring mask), forming openings 61. The etching of the second sacrificial layer 58 leads to the formation of hard masking regions 58' and automatically terminates on the first epitaxial layer 55. The openings 61 are defined between adjacent hard masking regions 58' and, in the illustrated embodiment, are arranged at the end of the out-of-plane sensing mass 13 further away from the fulcrum axis F, on the first structures 35a, 37a of the sensing supports 35 and of the feedback supports 37 and, in general, in zones where it is desired to form connection regions with the first epitaxial layer 55, e.g., the perimeter wall 25. Due to the recesses 60, the hard masking regions 58' have two different thicknesses: a greater thickness equal to that of the second sacrificial layer 58, and a smaller thickness where the recesses 60 are formed.

Subsequently, FIG. 14, a second structural layer 65 is grown, also in this case by epitaxy, for a thickness for example between 2 and 80 µm. The thickness of the second structural layer 65 is related to the desired micro-electro-mechanical structures, including the sensing supports 35 and the feedback supports 37. In general, the second structural layer 65 may be thinner than the first structural layer 55, even though the opposite may occur and the disclosure is not limited to any particular relationship between the thicknesses of the structural layers 55, 65. The semiconductor material, which during the epitaxial growth fills the recesses 60, forms the third sensing electrode 15c, the fourth sensing electrode 15d, the third feedback electrode 17c and the fourth feedback electrode 17d. After the epitaxial growth, the second structural layer 65 is planarized and brought to the desired final thickness, for example by CMP (Chemical Mechanical Polishing).

Figure 15:
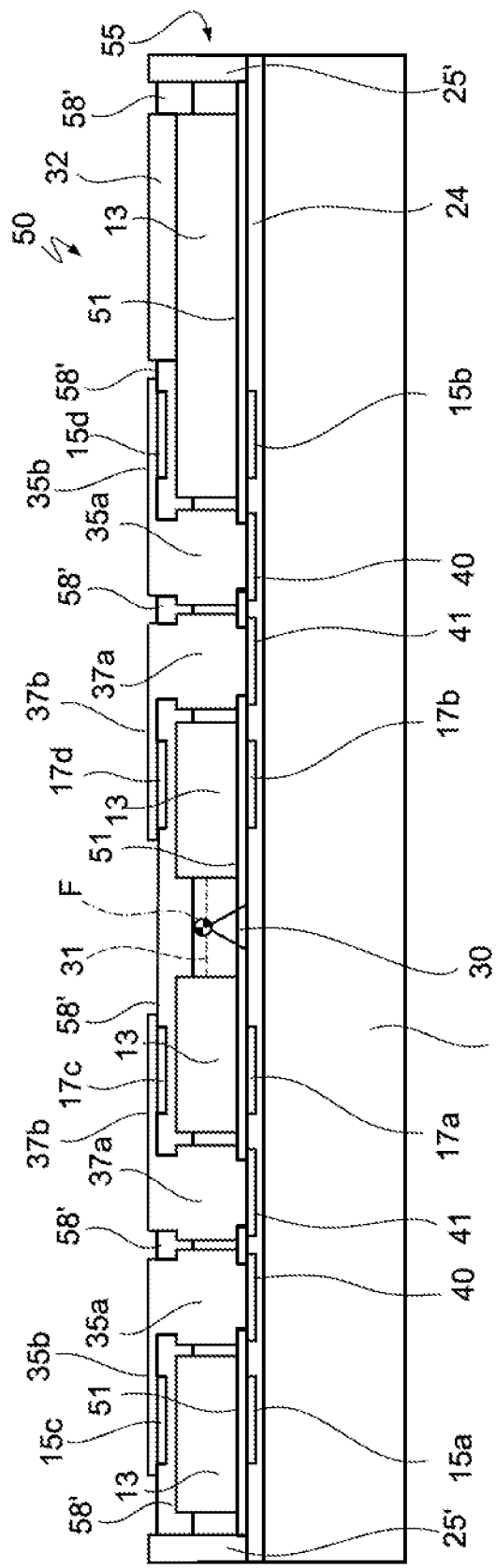

Subsequently, the second structural layer 65 is etched as shown in FIG. 15. For this purpose, the wafer 50 is covered by a resist mask (not illustrated) and subject to a dry etching. In this step, the portions of the second structural layer 25 not covered by the resist mask are removed throughout the thickness and the etching stops on the hard masking regions 58'.

In particular, in this step the out-of-plane sensing mass 13 (with the additional mass 32 formed from the second structural layer 65), the second structures 35b, 37b of the sensing supports 35 and of the feedback supports 37 and the upper part of the perimeter wall 25 are defined.

Then, the residual portions of the second sacrificial layer 55 and the first sacrificial layer 51 are removed, releasing the out-of-plane sensing mass 13.

Finally, a cap wafer is bonded to the wafer 50 by the adhesion layer 28 and the composite wafer thus obtained is diced to form the accelerometer 10 of FIG. 2.

Figure 16:
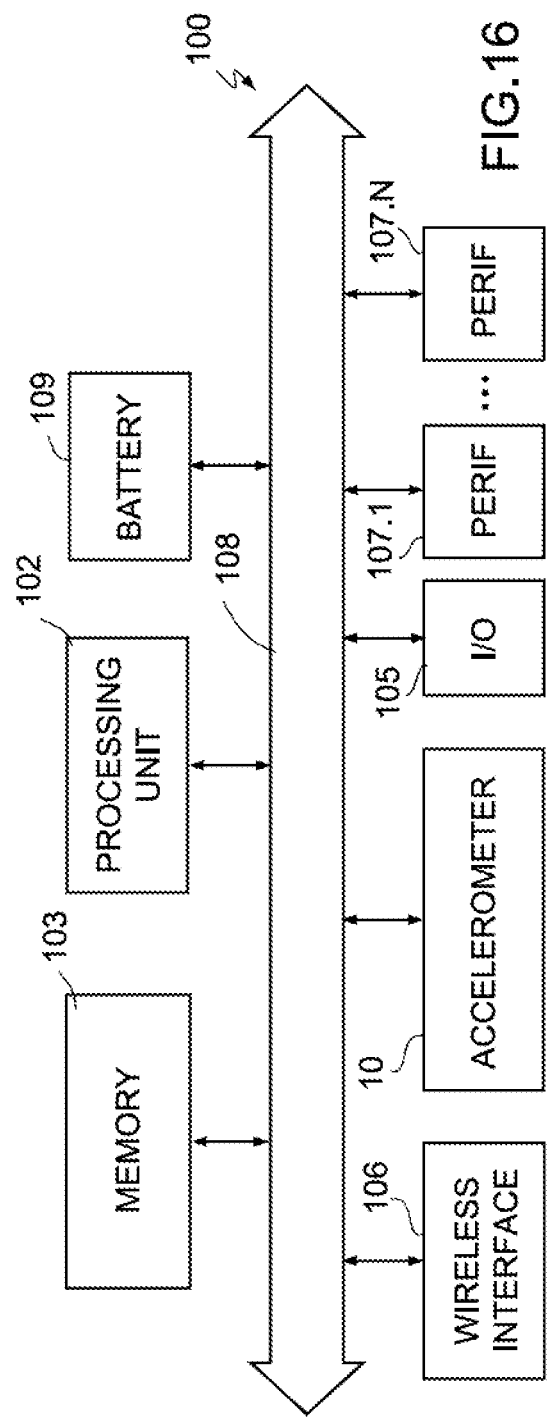
FIG. 16 is a simplified block diagram of an electronic system incorporating a microelectromechanical device according to the present disclosure.

FIG. 16 shows an electronic system 100 which may be of any type, in particular, but not limited to, a wearable device, such as a watch, a smart bracelet or band; a computer, such as a mainframe, a personal computer, a laptop or a tablet; a smartphone; a digital music player, a digital camera or any other device for processing, storing, transmitting or receiving information. The electronic system 100 may be a general purpose or device-embedded processing system, an equipment or a further system. For example, the electronic system 100 may be a system for monitoring vibrations in machinery of an industrial plant.

The electronic system 100 comprises a processing unit 102, memory devices 103, a microelectromechanical gyroscope according to the disclosure, for example the microelectromechanical gyroscope 1 of FIG. 1, and may also be provided with input/output (I/O) devices 105 (e.g., a keyboard, a pointer or a touch screen), a wireless interface 106, peripherals 107.1, . . . , 107.N and possibly further auxiliary devices, not shown here. The components of the electronic system 100 may be coupled in communication with each other directly and/or indirectly through a bus 108. The electronic system 100 may also comprise a battery 109. It should be noted that the scope of the present disclosure is not limited to embodiments necessarily having one or all the listed devices.

The processing unit 102 may include or be any processing circuitry configured to perform the various functions described herein with respect to the processing unit 102, and in some embodiments, the processing unit 102 comprise, for example, one or more microprocessors, microcontrollers and the like, according to the design preferences.

The memory devices 103 may comprise volatile memory devices and non-volatile memory devices of various kinds, for example SRAM and/or DRAM memories for the volatile-type and solid-state memories, magnetic disks and/or optical disks for the non-volatile type.

Finally, it is apparent that modifications and variations may be made to the microelectromechanical accelerometer and to the process described, without departing from the scope of the present disclosure.

In particular, the shape and dimensions of the sensing and feedback electrodes may be freely chosen according to the design preferences. Instead of through openings in the out-of-plane sensing mass, the supports for the sensing and feedback electrodes may be adjacent to the sensing mass and extend inwards on the second side. In this case, the flanks of the out-of-plane sensing mass might be variously shaped according to the design preferences.

A closed-loop microelectromechanical accelerometer may be summarized as including a substrate (23) of semiconductor material; an out-of-plane sensing mass (13) of semiconductor material, having a first side (13a) facing the supporting body (11) and a second side (13b) opposite to the first side (13a), wherein the out-of-plane sensing mass (13) is connected to the supporting body (11) to oscillate around a non-barycentric fulcrum axis (F) parallel to the first side (13a) and to the second side (13b) and perpendicular to an out-of-plane sensing axis (Z); and feedback electrodes (17a-17d), capacitively coupled to the sensing mass (13) and configured to apply opposite electrostatic forces ($F_{FB1}$, $F_{FB2}$) and a torque ($T_{FB}$) around the fulcrum axis (F) to the sensing mass (13); wherein the feedback electrodes (17a-17d) include a first group of feedback electrodes (17a, 17b) facing the first side (13a) of the out-of-plane sensing mass (13) and a second group of feedback electrodes (17c, 17d) facing the second side (13b) of the out-of-plane sensing mass (13).

The feedback electrodes (17a-17d) may include a first feedback electrode (17a) and a second feedback electrode (17b), arranged on the supporting body (11) symmetrically with respect to the fulcrum axis (F) and facing the first side (13a) of the out-of-plane sensing mass (13); and a third feedback electrode (17c) and a fourth feedback electrode (17d), supported by respective feedback supports (37) symmetrically with respect to the fulcrum axis (F) and facing the second side (13b) of the out-of-plane sensing mass (13).

The third feedback electrode (17c) and the fourth feedback electrode (17d) may be arranged in positions corresponding to positions of the second feedback electrode (17b) and of the first feedback electrode (17a), respectively.

The first feedback electrode (17a) and the third feedback electrode (17c) may be directly connected to each other and the second feedback electrode (17b) and the fourth feedback electrode (17d) may be directly connected to each other and may be insulated from the first feedback electrode (17a) and from the third feedback electrode (17c).

The feedback supports (37) may include respective first structures (37a), anchored to the supporting body (11) and extending in a direction parallel to the out-of-plane sensing axis (Z) through openings (38) in the out-of-plane sensing mass (13), and respective second structures (35b, 37b) which extend from the respective first structures (35a, 37a) in a direction perpendicular to the out-of-plane sensing axis (Z) and face the second side (13b) of the out-of-plane sensing mass (13).

The feedback supports (37) may be of semiconductor material and the first structures (37a) may be connected to respective feedback conductive lines (41) formed on the supporting body (11) and insulated from each other.

The accelerometer may include sensing electrodes (15a-15d), capacitively coupled to the sensing mass (13) and configured to sense an angular position of the sensing mass (13) around the fulcrum axis (F).

The sensing electrodes (15a-15d) may include a first sensing electrode (15a) and a second sensing electrode (15b), arranged on the supporting body (11) symmetrically with respect to the fulcrum axis (F) and facing the first side (13a) of the out-of-plane sensing mass (13); and a third sensing electrode (15c) and a fourth sensing electrode (15d), supported by respective sensing supports (35) symmetrically with respect to the fulcrum axis (F) and facing the second side (13b) of the out-of-plane sensing mass (13); and the third sensing electrode (15c) and the fourth sensing electrode (15d) may be arranged in positions corresponding to positions of the second sensing electrode (15b) and of the first sensing electrode (15a), respectively.

The first sensing electrode (15a) and the third sensing electrode (15c) may be directly connected to each other and the second sensing electrode (15b) and the fourth sensing electrode (15d) may be directly connected to each other and may be insulated from the first sensing electrode (15a) and from the third sensing electrode (15c).

The sensing supports (35) may include respective first structures (35a), anchored to the supporting body (11) and extending in a direction parallel to the out-of-plane sensing axis (Z) through openings (38) in the out-of-plane sensing mass (13), and respective second structures (35b, 35b) which extend from the respective first structures (35a, 35a) in a direction perpendicular to the out-of-plane sensing axis (Z) and face the second side (13b) of the out-of-plane sensing mass (13); and wherein the sensing supports (35) may be of semiconductor material and the first structures (35a) may be connected to respective sensing conductive lines (40) formed on the supporting body (11) and insulated from each other.

The accelerometer may include a sensing stage (18), coupled to the sensing electrodes (15) and configured to generate reading signals (SR) indicative of an angular position of the out-of-plane sensing mass (13) around the fulcrum axis (F); a control device (20), configured to supply the feedback electrodes (17) with control signals (SC) generated from the reading signals (SR) and configured to apply the electrostatic forces ($F_{FB1}$, $F_{FB2}$) so as to bring the out-of-plane sensing mass (13) back to an equilibrium position in response to inertial forces.

The electrostatic forces ($F_{FB1}$, $F_{FB2}$) may include first electrostatic feedback forces ($F_{FB1}$) having equal modulus and opposite directions and second electrostatic feedback forces ($F_{FB1}$) having equal modulus and opposite directions.

An electronic system may be summarized as including a processing unit (102) and a microelectromechanical accelerometer (10) coupled to the processing unit (102).

A process for manufacturing a closed-loop microelectromechanical accelerometer, may be summarized as including forming an out-of-plane sensing mass (13) of semiconductor material, having a first side (13a) facing the supporting body (11) and a second side (13b) opposite to the first side (13a), wherein the out-of-plane sensing mass (13) is connected to a supporting body (11) to oscillate around a non-barycentric fulcrum axis (F) parallel to the first side (13a) and to the second side (13b) and perpendicular to an out-of-plane sensing axis (Z); and forming feedback electrodes (17a-17d), capacitively coupled to the sensing mass (13) and configured to apply opposite electrostatic forces ($F_{FB1}$, $F_{FB2}$) and a torque ($T_{FB}$) around the fulcrum axis (F) to the sensing mass (13); and wherein forming feedback electrodes (17a-17d) includes on a substrate (23) of the supporting body (11), forming a first epitaxial structural layer (55), partially separated from the substrate by an insulating layer (24) with openings; forming a first group of feedback electrodes (17a, 17b) between the substrate (23) and the first side of the out-of-plane sensing mass (13); forming hard masking regions (58') on the first epitaxial structural layer (55) and first openings (61) between adjacent hard masking regions (58'); forming a second epitaxial structural layer (65) connected to the first epitaxial structural layer (55) through the first openings (61); and obtaining a second group of feedback electrodes (17c, 17d) from the second epitaxial structural layer (65).

The process may include forming second openings (38) through the out-of-plane sensing mass (13); and forming feedback supports (37) extending from the substrate (23) through the second openings (38) for the second group of feedback electrodes (17c, 17d); wherein forming feedback supports (37) may include obtaining first structures (37a) of the feedback supports (37) from the first epitaxial structural layer (55) and obtaining second structures (37b) of the feedback supports (37) from the second epitaxial structural layer (65).

Forming the out-of-plane sensing mass (13) may include obtaining the out-of-plane sensing mass (13) from the first epitaxial structural layer (55).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A closed-loop microelectromechanical accelerometer, comprising:
    a supporting body;
    an out-of-plane sensing mass of semiconductor material, having a first side facing the supporting body and a second side opposite to the first side, wherein the out-of-plane sensing mass is connected to the supporting body to oscillate around a non-barycentric fulcrum axis parallel to the first side and to the second side and perpendicular to an out-of-plane sensing axis; and
    feedback electrodes, capacitively coupled to the sensing mass and configured to apply opposite electrostatic forces and a torque around the fulcrum axis to the sensing mass,
    wherein the feedback electrodes include:
        a first feedback electrode and a second feedback electrode, through the first and second feedback electrodes are arranged on the supporting body symmetrically with respect to the fulcrum axis and facing the first side of the out-of-plane sensing mass; and
        a third feedback electrode and a fourth feedback electrode, the third and fourth feedback electrodes are supported by respective feedback supports symmetrically with respect to the fulcrum axis and facing the second side of the out-of-plane sensing mas,
    wherein the respective feedback supports include:
        respective first structures anchored to the supporting body and extending in a direction parallel to the out-of-plane sensing axis through openings in the out-of-plane sensing mass; and
        respective second structures that extend from the respective first structures in a direction perpendicular to the out-of-plane sensing axis and face the second side of the out-of-plane sensing mass.

2. The accelerometer according to claim 1, wherein the third feedback electrode and the fourth feedback electrode are arranged in positions corresponding to positions of the second feedback electrode and of the first feedback electrode, respectively.

3. The accelerometer according to claim 2, wherein the first feedback electrode and the third feedback electrode are directly connected to each other, and the second feedback electrode and the fourth feedback electrode are directly connected to each other and are insulated from the first feedback electrode and from the third feedback electrode.

4. The accelerometer according to claim 1, wherein the feedback supports are of semiconductor material and the first structures are connected to respective feedback conductive lines formed on the supporting body and insulated from each other.

5. The accelerometer according to claim 1, comprising sensing electrodes, capacitively coupled to the sensing mass and configured to sense an angular position of the sensing mass around the fulcrum axis.

6. The accelerometer according to claim 5, wherein the sensing electrodes include:
    a first sensing electrode and a second sensing electrode, the first and second sensing electrodes are arranged on the supporting body symmetrically with respect to the fulcrum axis and facing the first side of the out-of-plane sensing mass; and
    a third sensing electrode and a fourth sensing electrode, the third and fourth sensing electrodes are supported by respective sensing supports symmetrically with respect to the fulcrum axis and facing the second side of the out-of-plane sensing mass,
    wherein the third sensing electrode and the fourth sensing electrode are arranged in positions corresponding to positions of the second sensing electrode and of the first sensing electrode, respectively.

7. The accelerometer according to claim 6, wherein the first sensing electrode and the third sensing electrode are directly connected to each other, and the second sensing electrode and the fourth sensing electrode are directly connected to each other and are insulated from the first sensing electrode and from the third sensing electrode.

8. The accelerometer according to claim 6, wherein the sensing supports include respective first structures, anchored to the supporting body and extending in a direction parallel to the out-of-plane sensing axis through openings in the out-of-plane sensing mass, and respective second structures which extend from the respective first structures in a direction perpendicular to the out-of-plane sensing axis and face the second side of the out-of-plane sensing mass,
wherein the sensing supports are of semiconductor material and the first structures are connected to respective sensing conductive lines formed on the supporting body and insulated from each other.

9. The accelerometer according to claim 5, comprising:
a sensing stage coupled to the sensing electrodes and configured to generate reading signals indicative of an angular position of the out-of-plane sensing mass around the fulcrum axis; and
a control device configured to supply the feedback electrodes with control signals generated from the reading signals and configured to apply the electrostatic forces so as to bring the out-of-plane sensing mass back to an equilibrium position in response to inertial forces.

10. The accelerometer according to claim 9, wherein the electrostatic forces include first electrostatic feedback forces having equal modulus and opposite directions and second electrostatic feedback forces having equal modulus and opposite directions.

11. An electronic system, comprising:
processing circuitry; and
a closed-loop microelectromechanical accelerometer coupled to the processing circuitry, the accelerometer including:
a supporting body;
an out-of-plane sensing mass of semiconductor material having a first side facing the supporting body and a second side opposite to the first side, the out-of-plane sensing mass is connected to the supporting body to oscillate around a non-barycentric fulcrum axis parallel to the first side and to the second side and perpendicular to an out-of-plane sensing axis;
a first and second through opening extending through the out-of-plane sensing mass;
feedback supports including respective first structures being anchored to the supporting body and extending in a direction parallel to the out-of-plane sensing axis through the first and second through openings in the out-of-plane sensing mass, and respective second structures which extend from the respective first structures in a direction perpendicular to the out-of-plane sensing axis and face the second side of the out-of-plane sensing mass; and
feedback electrodes, capacitively coupled to the sensing mass and configured to apply opposite electrostatic forces and a torque around the fulcrum axis to the sensing mass, the feedback electrodes include:
a first group of feedback electrodes facing the first side of the out-of-plane sensing mass, the first group of feedback electrodes including a first feedback electrode and a second feedback electrode arranged on the supporting body on opposite sides of the fulcrum axis; and
a second group of feedback electrodes facing the second side of the out-of-plane sensing mass, the second group of feedback electrodes including a third feedback electrode and a fourth feedback electrode on opposite sides of the fulcrum axis, each of the third electrode and the fourth electrode being on a corresponding respective second structure of the feedback supports.

12. The electronic system according to claim 11, wherein the first feedback electrode and the second feedback electrode are arranged on the supporting body symmetrically with respect to the fulcrum axis, and
the third feedback electrode and the fourth feedback electrode are arranged symmetrically with respect to the fulcrum axis and facing the second side of the out of plane sensing mass.

13. The electronic system according to claim 12, wherein the third feedback electrode and the fourth feedback electrode are arranged in positions corresponding to positions of the second feedback electrode and of the first feedback electrode, respectively.

14. The electronic system according to claim 13, wherein the first feedback electrode and the third feedback electrode are directly connected to each other, and the second feedback electrode and the fourth feedback electrode are directly connected to each other and are insulated from the first feedback electrode and from the third feedback electrode.

15. A closed-loop microelectromechanical accelerometer, comprising:
a supporting body;
an out-of-plane sensing mass having a first side facing and coupled to the supporting body, a second side opposite to the first side, the out-of-plane sensing mass is connected to the supporting body to oscillate around a non-barycentric fulcrum axis parallel to the first side and to the second side and perpendicular to an out-of-plane sensing axis; and
sensing electrodes capacitively coupled to the sensing mass and configured to sense an angular position of the sensing mass around the fulcrum axis, wherein the sensing electrodes include:
a first sensing electrode and a second sensing electrode, the first and second sensing electrodes are arranged on the supporting body symmetrically with respect to the fulcrum axis and facing the first side of the out-of-plane sensing mass; and
a third sensing electrode and a fourth sensing electrode, the third and fourth sensing electrodes are supported by respective sensing supports symmetrically with respect to the fulcrum axis and facing the second side of the out-of-plane sensing mass,
wherein the respective sensing supports include:
respective first structures anchored to the supporting body and extending in a direction parallel to the out-of-plane sensing axis through openings in the out-of-plane sensing mass; and
respective second structures that extend from the respective first structures in a direction perpendicular to the out-of-plane sensing axis and face the second side of the out-of-plane sensing mass.

16. The accelerometer according to claim 15, wherein the openings in the out-of-plane sensing mass include:
a first opening that extends through the out-of-plane sensing mass;
a second opening that extends through the out-of-plane sensing mass spaced apart from the first opening; and
a third opening between the first opening and the second opening.

17. The accelerometer according to claim 15, wherein the out-of-plane sensing mass is formed from an epitaxial structural layer.

18. The accelerometer of claim 15, wherein the respective sensing supports are of semiconductor material and the first structures are connected to respective sensing conductive lines formed on the supporting body and insulated from each other.

19. The accelerometer of claim 16, wherein:
- a first one of the respective sensing supports extends through the first opening, the first one of the respective sensing supports suspends the third sensing electrode to overlap the out-of-plane sensing mass;
- a second one of the respective sensing supports extends through the second opening, the second one of the respective sensing supports suspends the fourth sensing electrode to overlap the out-of-plane sensing mass; and
- the fulcrum axis extends across the third opening.

* * * * *

UNITED STATES PATENT AND TRADEMARK OFFICE
CERTIFICATE OF CORRECTION

PATENT NO. : 11,965,906 B2
APPLICATION NO. : 17/866378
DATED : April 23, 2024
INVENTOR(S) : Gabriele Gattere Page 1 of 1

It is certified that error appears in the above-identified patent and that said Letters Patent is hereby corrected as shown below:

In the Claims

Column 12, Claim 1, Line 18:
"sensing mas,"
Should read:
--sensing mass,--.

Column 14, Claim 12, Lines 10-12:
"arranged symmetrically with respect to the fulcrum axis and facing the second side of the out of plane sensing mass."
Should read:
--arranged symmetrically with respect to the fulcrum axis.--.

Signed and Sealed this
Ninth Day of July, 2024

Katherine Kelly Vidal
*Director of the United States Patent and Trademark Office*